United States Patent [19]
Aptroot-Soloway

[11] 3,974,496
[45] Aug. 10, 1976

[54] DATA ENTRY SYSTEMS

[76] Inventor: Bernard Aptroot-Soloway, 6 Sylva Court, Putney Hill, London SW15, England

[22] Filed: Oct. 30, 1974

[21] Appl. No.: 519,250

Related U.S. Application Data
[63] Continuation-in-part of Ser. No. 425,820, Dec. 18, 1973, abandoned.

[30] Foreign Application Priority Data
Dec. 19, 1972    United Kingdom............. 58513/72

[52] U.S. Cl............................ 340/337; 235/145 R; 340/172.5; 340/324 R
[51] Int. Cl.² ......................................... G08B 5/36
[58] Field of Search............ 340/337, 365 R, 172.5, 340/324 R; 35/35 C; 235/145 R

[56] References Cited
UNITED STATES PATENTS

| | | | |
|---|---|---|---|
| 2,871,289 | 1/1959 | Cox et al. ....................... | 340/365 S |
| 3,187,321 | 6/1965 | Kameny ......................... | 340/365 R |
| 3,248,703 | 4/1966 | Moore et al. ................... | 340/172.5 |
| 3,533,076 | 10/1970 | Perkins et al. .................. | 340/172.5 |
| 3,576,433 | 4/1971 | Lee et al. ....................... | 340/365 S |
| 3,679,875 | 7/1972 | Rawson et al. ................. | 340/365 R |
| 3,805,255 | 4/1974 | Baker ............................. | 235/92 EA |

Primary Examiner—David L. Trafton
Attorney, Agent, or Firm—Stevens, Davis, Miller & Mosher

[57] ABSTRACT

This invention relates to the presentation of at least two different sets of information to an observer simultaneously and in the same location, one superposed upon the other, one set of information concerning characters inscribed on a source carrier or document, the other set produced by a data processing machine.

The invention concerns a data entry system in which data read by an operator from a source information carrier is fed by signals from a keyboard by the operator into a data processing machine and in which operator instructions concerning the keying of the source data are produced by the data processing machine and are visually displayed to the operator on a visual display device.

According to the invention the visual display device is located in juxtaposition with the source information carrier and the visually displayed operator instructions.

13 Claims, 10 Drawing Figures

DATA ENTRY SYSTEMS

CROSS-REFERENCES TO RELATED APPLICATIONS

This application is a continuation-in-part of application Ser. No. 425,820, filed Dec. 18, 1973, now abandoned.

BACKGROUND OF THE INVENTION

This invention relates to the presentation of at least two different sets of information to an observer simultaneously and at the same location, one set being superposed upon the other, one set of information concerning characters inscribed on a source carrier or document, the other set being produced by a data processing machine. According to the invention the latter information is displayed in juxtaposition to the source data carrier and the visually displayed operator instructions. In prior arrangements the display is located remotely from the document thus entailing considerably eye and head movements of the operator.

The source data will have been inscribed on the data carrier or document by an originator. The machine instructions to the operator concerning the keying of this source data may be indicated by means of small diameter light sources in juxtaposition to the document so that each instruction is visible to the viewer as information superposed by being positioned immediately above the inscribed data. Neither set of data interferes with the other. The localized document area on which characters are inscribed and of interest to the viewer, at any particular time during the operation, is one document line containing one or more fields to be keyed in. It is seen in document context by the operator. The machine produced information which marks the fields on the line and to be keyed in consists of luminous markers of contrasting color to the non-illuminated area of the document containing the data to be keyed. In addition alpha/numeric computer feedback information may be displayed immediately above these luminous markers.

BRIEF DESCRIPTION OF THE DRAWINGS

The scope of the invention is defined by the appended claims, and how the invention can be performed is hereinafter particularly described with reference to the accompanying drawings in which:

DETAILED DESCRIPTION OF PREFERRED EMBODIMENT

Referring to the unit illustrated in FIGS. 1 to 6 and 9 of the drawings a feed-in plate 10 has a side guide 11 under and against which an operator places a source information carrier, which may comprise a pre-printed document such as an insurance or banking form, an application for a driving or vehicle license, and so on, hereinafter referred to as a document, on which data has been inscribed by an originator. This comprises a first set of information. Located just above the forward end of feed-in plate 10 is a row of light emitting diodes (l.e.d.) 12, which may be Toshiba type TLR. 102 or other suitable commercially available equivalent. These are mounted in a row horizontally along the bottom edge of a display plate 13 and are activated to indicate to the operator the relevant fields on a line on a document and the order in which they are to be keyed. This is indicated by way of example in FIG. 9. The activated diodes 12 provide a second set of information for the operator. The number or pitch of l.e.d. markers 12 is arbitrary. If three per inch are used, then 36 will be required for a 12 inch wide document.

A Burroughs Self-Scan alpha-numeric display 14, Type SSD0132-0060 or other commercially available 32-character in line-display is mounted in display plate 13 as close as possible above the row of l.e.d. markers 12. As a field of 32 characters is abnormally long a 32-character in-line display is usually adequate. However, a Burroughs Self-Scan 80 character in-line display is available and can be used if required. The information displayed on 14 constitutes a third set of information.

From the operator's point of view the markers 12 and the information displayed on 14 form an extension of the document itself and the lower edge of this extension commences at all times immediately above the field or line of fields to be keyed. The computer feed-bck information is thus superposed upon the source document, while that data on the document already keyed is invisible to the operator as it is hidden by display plate 13.

Figure 1:
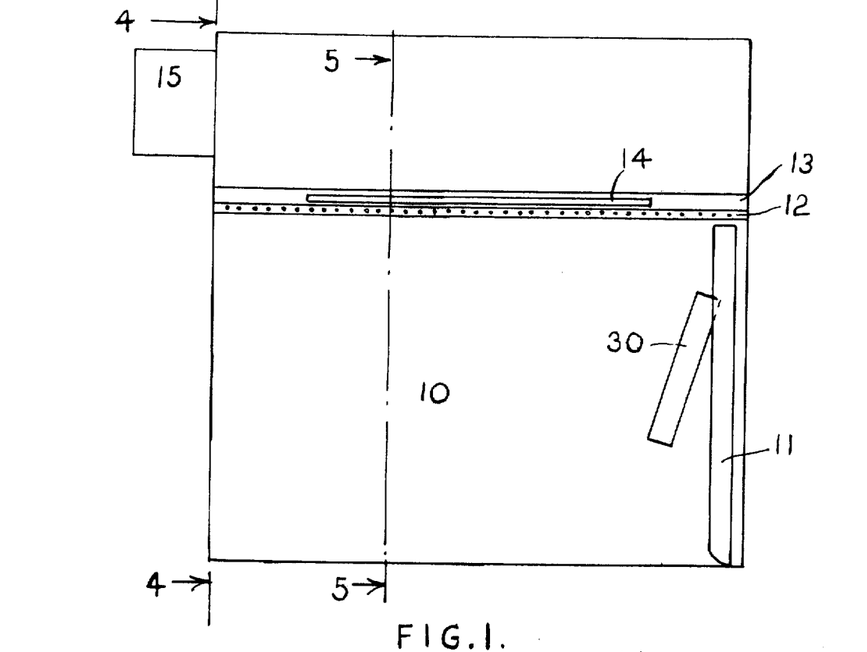
FIG. 1 is a plan view of one embodiment of the invention, by way of example only.
Figure 2:
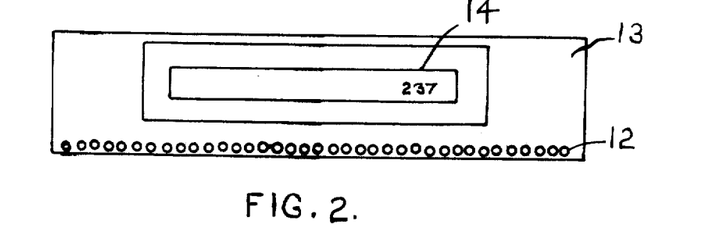
FIG. 2 is a front view of the display panel looking in the direction of the arrow 2 in FIG. 4.
Figure 3:
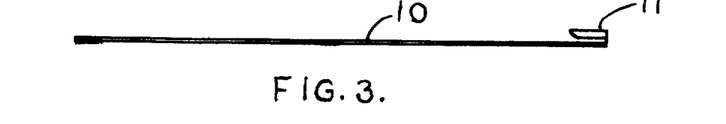
FIG. 3 is a scrap view of the front edge of the feed-in plate of FIG. 1.
Figure 4:
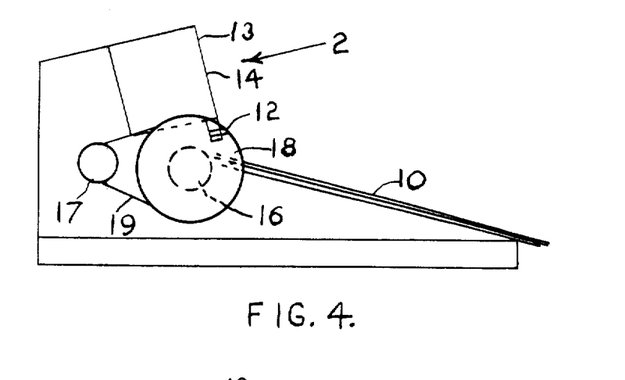
FIG. 4 is a diagrammatic side view taken in the direction of the arrows 4—4 of FIG. 1.
Figure 5:
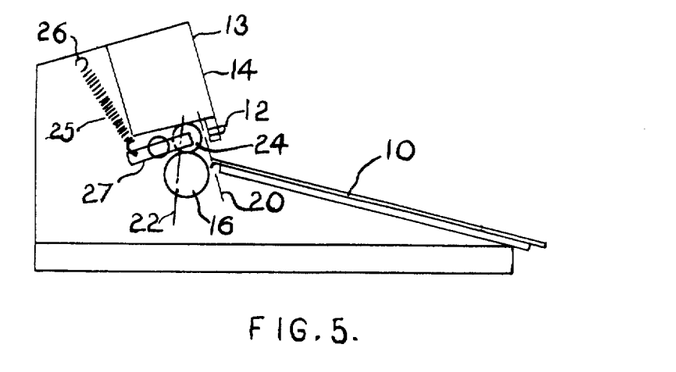
FIG. 5 is a diagrammatic section taken on the line 5—5 of FIG. 1.

Forward and reverse movements of the document placed on the feed-in plate 10 is effected by a stepping motor 15 which drives a platen roller 16 via pulleys 17, 18 and belt 19 (FIG. 4). The stepping motor is Impex (Philips) IDO.5 or any other suitable commercially available equivalent and has standard printed control circuits which are commercially available and are listed hereinafter. As the line feed can be forward or reverse the system can show the operator fields line by line in consecutive order, or in a reformated order, i.e. it can sequence any X-Y position in any order. The incremental paper movement is dependent on the ratio of drive pulleys 17, 18 (FIG. 4).

When the leading edge of the document is moved under the display plate 13 by the operator it breaks a light beam indicated at 20 of a photo-cell 21. This starts the stepping motor 15. The document leading edge moves between rollers 24 and platen 16 after which it breaks a light beam indicated at 22, (FIG. 5), of a second photo-cell 23 which is the reference position for all forward and reverse movements of the document in relation to the row of l.e.d. markers 12. The photocells are IPL Type 21, or other commercially available equivalent.

Figure 6:
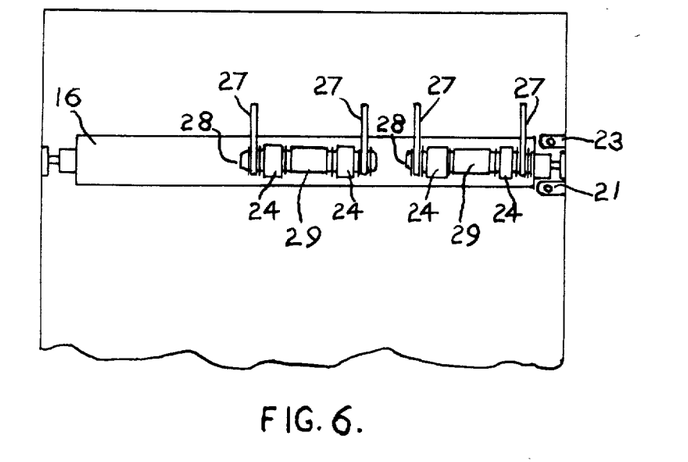
FIG. 6 is a scrap view showing pinch rolls for the document feed.

Rollers 24 (FIGS. 5 and 6) are held down onto platen 16 by springs 25 secured at 26 via fulcrum bars 27. As shown in FIG. 6 rollers 24 are mounted in pairs on shafts 28, each pair being separated by a spacer 29. The sprung fulcrum bars 27 spring load each roller 24 independently. The paper drive is thus not affected by document thickness, unequal layers of documents, pins, staples or other differences in overall document thickness. However, alternative means may be used for the paper drive.

A thin friction strip of rubber 30 (FIG. 1) is adhered to or let into feed-in plate 10. This rubber does not impair feed-in of a single document or of pinned documents but if two separate documents are accidentally placed on plate 10 then the lower sheet will remain behind as the friction between the rubber pad 30 and the bottom sheet is greater than that between two separate sheets of paper.

The display unit described above is utilized as shown in FIG. 10 in conjunction with logic circuits now to be described and a keyboard (also shown in FIG. 10) which can be of any commercially available type used with a central processing unit (CPU), but if the keyboard output is not ASCII, then a code converter is inserted between the keyboard and the input to the Burroughs Self-Scan display 14. Characters are fed into the display from right to left whereby the 33rd character drops off at the left. Use of an erase key causes all characters displayed to be moved from left to right so that the last entered character drops off at the right. In the key operation keyed characters are displayed and the last character keyed is always the right hand character displayed, while on the document the field keyed is the left hand field marked. If the system detects an error then the error message, e.g. "non-valid" can be entered into the display from right to left shifting the last keyed characters to the left. When the operator commences corrective action, such as use of the erase key, the system transmits as many erase codes as the number of characters used for the error message. This causes the error message to drop off at the right and the keyed characters to move back to the right hand position. The error message causes some characters on the left hand to disappear. As the total display is 32 characters long these characters no longer displayed are of no significance to the operator. Alternatively such instructions can be displayed on illuminated legend panels.

In the verifying mode the characters keyed by the key operator are shown to the verifier on the display. If the verifier's keyed value does not match then the system inaugurates the error condition. An error message can then be displayed if required. Corrective action is related to the lat right hand character or field displayed. For alternative operations any other information, e.g. batch balances, can be displayed for any action required from the operator.

Figure 7:
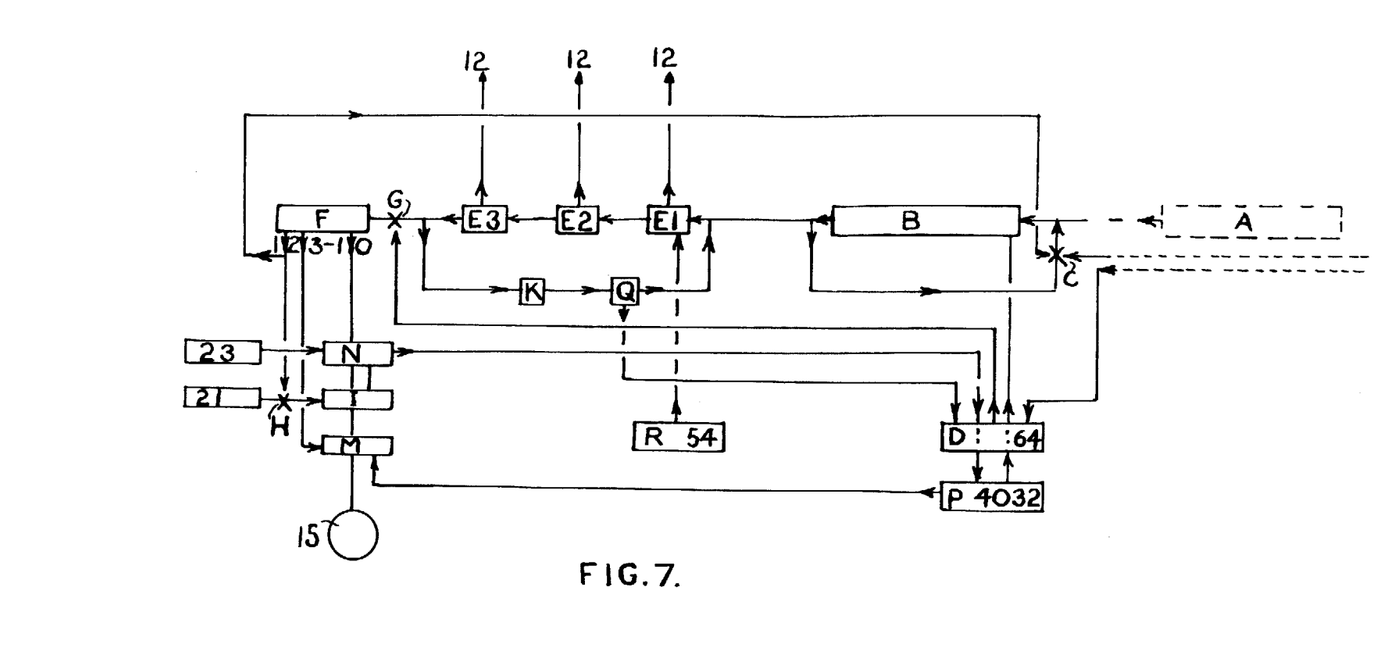
FIG. 7 is a block diagram of logic circuits of a non-programmable display unit according to the present invention.
Figure 10:
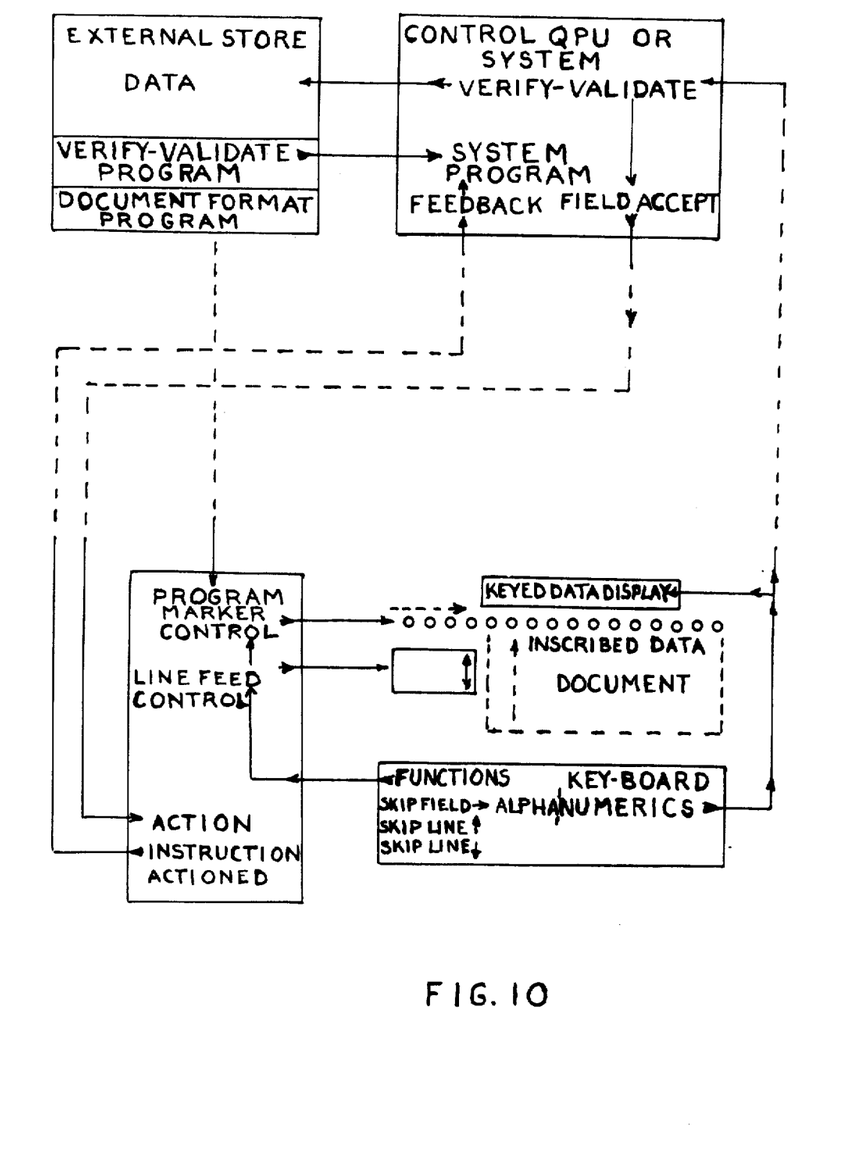
FIG. 10 is a block diagram showing the interlock of the display unit with external circuits.

Reference will now be made to FIG. 7 which shows block diagram logic circuits of a non-programmable display unit according to the present invention. The function switches shown on the keyboard on FIG. 10 are the switches which control the operator's instructions to the logic circuits of FIG. 7 described hereinafter. A is a convenient external store — CPU disc, tape loop, magnetically striped card — from which th operator selects the required document program for insertion into B, a 4096 bit program buffer store shift register. C is a recirculation line inhibit switch which, in the open position, inhibits the recirculation of buffer store B, D is a 64 bit shift control, E1, E2, E3, are each 18 bit shift registers each controlling 18 l.e.d. markers (reference 12 FIGS. 1 and 2), F is a 10 bit series-in/parallel-out shift register, G and H are switches, I is a pulse generator, K is a gate circuit, M is a direction control for forward or reverse stepping motor 15, N is a counter, P is a 4032 bit shift control, Q is a recognition gate circuit and R is a 54 bit shift register. The various circuit connections are as indicated on the drawing.

At the start of the program insertion switch C-in the B recirculation line-is opened and, when the insertion has been completed, D—the 64 bit shift control—is triggered.

D first closes switch G, between E.3 and F, shifts a 64 bit instruction from B into E.1-2-3-F and, on completion, re-opens switch G. A "1" bit on pin 1 of F closes switch H between photocell 21 and pulse generator I, but does not action switch C or shift control D. A "0" bit on this pin opens switch H, closes switch C and triggers a 64 bit shift by D. The bit on pin 2 of F controls the forward or reverse running direction of stepping motor 15 via M. The bits on pins 3–10 of F set counter N to the programmed 8 bit linefeed step number. Stepping motor 15 powers the linefeed.

OPERATION

Feed-in line of a new document program from A into B opens switch C and reads the first 64 bit instructions into E.1-2-3-F as described. The bits in E.1-2-3 switch on the programmed l.e.d. markers 12, FIGS. 1, 2 & 9 ("1" = On, "0" = Off). As stated above the 10 bits in F close switch H, set the motor 15 run direction and the number of steps to be run on counter N.

When the operator places a document on the feed-in plate 10 and shifts it upwards along the side guide 11 its leading edge obscures photocell 21, which switches pulse generator I to motor 15. The document leading edge is gripped by the (running) document feed (platen roller 16 and rollers 24—FIGS. 5 and 6) and obscures photocell 23. The latter connects counter N to pulse generator I and counts down stepping pulses until zero is reached. At zero, counter N disconnects motor 15 from I, so that the document halts at the programmed line position, and transmits a "linefeed-completed" signal to D. D is now free to operate but does not do so until it is triggered. Thus a control instruction from the system or computer instructs the number of counts to be run so that the drive will halt when the first field or line of fields on the document is in front of and below display plate 13. The number of bits forming the linefeed instruction is dependent on the maximum paper movement required by the user for any single movement. Preferred increments are 0.5 or 1.0mm per motor step.

The operator commences to key in the fields indicated by activated l.e.d. markers 12. Dependent on the user's requirements, either or both the controlling systems "field accepted" signal or operator's "field completed" function key or "skip field" key, on the keyboard (not shown) can trigger a 54 bit shift by R. This recirculates the 54 marker bits in E.-1-2-3 via K and Q.

Gate circuit K re-acts to the first "1" or consecutive series of "1" bits recirculated by converting "1" bits to "0" bits. The first "0" bit following this action switches K off so that all remaining bits are recirculated unchanged. K thus switches off the markers 12 related to the field keyed and accepted from left to right, that is, all fields to the right of the eliminated field remain marked. The remaining markers 12 are eliminated— field by field— as each field is keyed and accepted as a result of a trigger pulse to R. 54 bits are all that is required for any particular line — independent of the number of fields on the line programmed.

Q does not re-act to "1" bits. It triggers D when, in the course of a 54 bit recirculation by R, no "1" bits are detected. When, therefore the operator has keyed in the last marked field on the line and this has been accepted, Q triggers D which causes a new 64 bit instruction to be read into E.1-2-3-F. This causes new markers 12 to be switched on and the document to be moved to the next programmed line in position.

An error code may be utilized to cause the l.e.d. marker common connection to be switched on and off at 4 or 5 Hz. The error condition is therefore directly imparted to the operator's visual sense at the location where attention is concentrated. An error cancel code may cause the common connection to be restored to "On".

If the first 64 bit instruction in the program consists of "0" bits, then the "0" bit on F pin 1 will open switch H, close switch C and trigger D to move the next 64 bit instruction into E.1-2-3-F. A 64 × "0" bit instruction in any position in the program, closes the program buffer store recirculation line switch C, so that from then on the contents of B are recirculated. This is normally used to separate the batch header, which must be keyed in once only, from the document proper program which must be repeated once for each document in the stack.

As the capacity of B is an exact multiple 64 × 64=4096, D will be repeatedly triggered at the completion of a document proper program, until the first line instruction is again in E.1-2-3-F.

If, therefore, the batch header should consist of four lines and, in order to switch in the buffer store recirculation line, this is followed by one line instruction of "0" bits, and the document proper requires 33 line instructions, the program takes up 4+1+33 = 38 × 64 bits. The 4096 bit buffer store is thus completed by a further 64–38 = 26 64 bit instructions consisting of "0" bits. As the first "0" bit of each of these causes D to shift in the next 64 bits, the recirculation will automatically continue until the first instruction proper has been shifted into E.1-2-3-F and the first "1" bit of this instruction occurs on pin 1 of F, thereby halting the repeat action of D.

Both the controlling system and the operator's function keys shown in the keyboard on FIG. 10 can trigger R, D and P and, on completion of their operation, each produces an "instruction completed" feedback signal.

R is effectively a "skip field" control

D is effectively a "skip line downward" control

P is effectively a "skip line upward" control

As a 4032 bit shift is 1 × 64 less than the capacity of B, it reads in the 64 bit instruction previous to the present one. P inverts the direction bit fed from F pin 2 to M, so that the document is moved the distance programmed by the new instruction but in the reverse direction.

Both the controlling system and operator's keyboard function keys can control "repeated line skip" action. As the linefeed distances vary and pulse generator I is set to approximately 200 Hz, the time taken for linefeeds will vary. D and P are, therefore, inhibited from shifting in a new instruction until counter N has reached zero-seen above.

Figure 8:
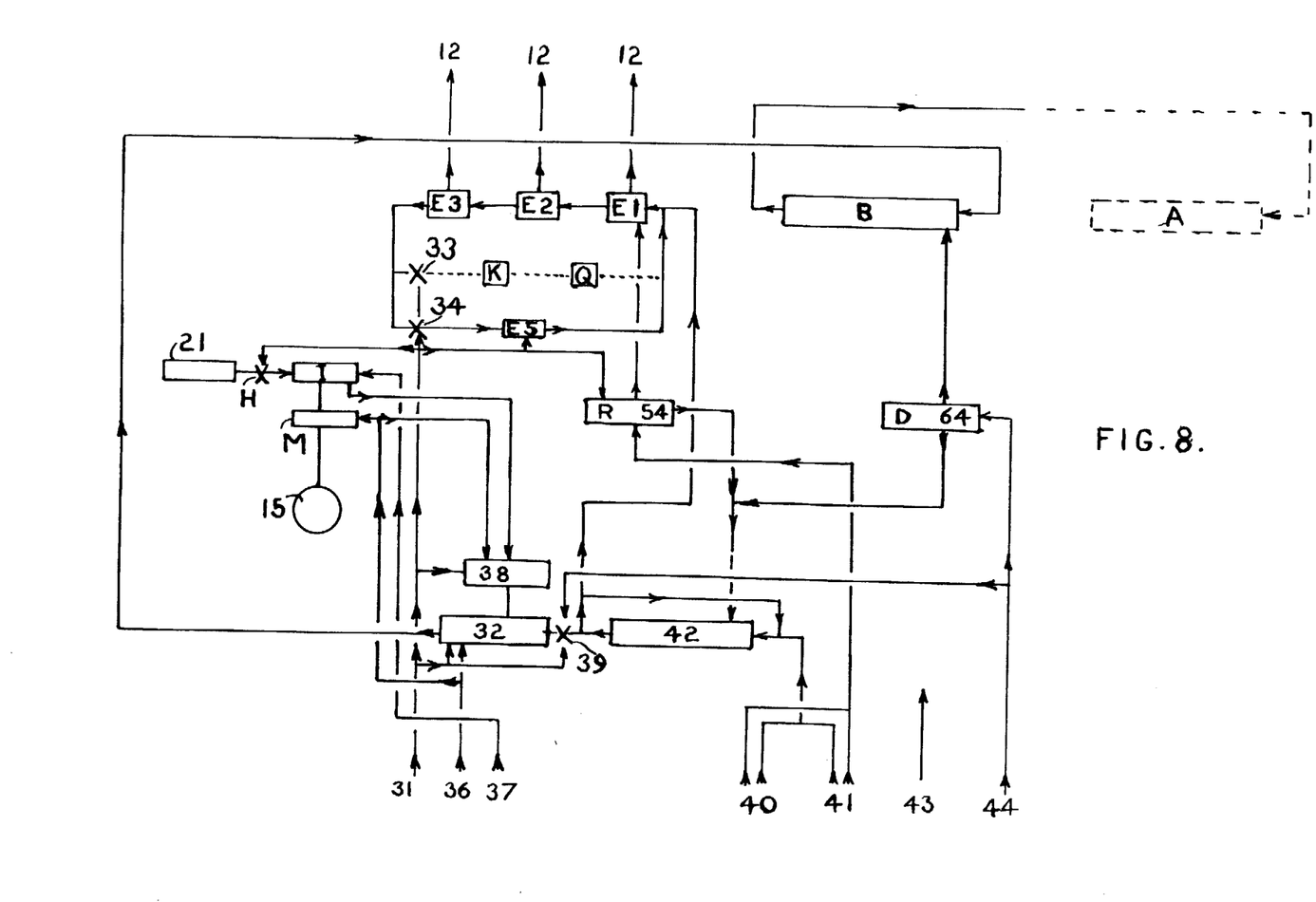
FIG. 8 is a block diagram similar to FIG. 7 and including additional logic circuits for a programmable display unit.

FIG. 10 is a block diagram (or flow sheet) illustrating the interlock of the display unit with the external circuits. FIG. 8 is a block diagram similar to FIG. 7 but includes additional logic circuits for a programmable display unit. Not all units require programming facilities. The parts common to FIGS. 7 and 8 are given the same references. References 31, 33, 34, 36, 37, 39, 40, 41, 43, 44, are switches. 32 denotes a 10 bit parallel-in/series-out shift register. E5 is a single bit shift register. An up-down 8 bit counter is denoted by reference 38 and 42 is a first in/first out 54 bit shift register.

The programming keyboard consists of switches 31, 36, 37, 40, 41, 43 and 44. Key 31 sets the circuit for programming by opening switch 39 between 32 and 42, inserts a "1" bit—via pin one—into 32, resets up/down counter 38 to zero, erases the contents of E.1-2-3, opens switch 33 to isolate K and Q and closes switch 34 to include E5 in the E.1-2-3 recirculation line, inserts a "1" bit into E.5 and then generates a 54 bit shift by R to move this "1" from E5 to position 1 of E.3, closes switch H between photocell 21 and I.

When the document to be programmed is inserted, the leading edge obscures photo-cell 21 to start pulse generator I. Motor 15 runs the paper drive, which moves the document to the position of photo-cell 23 where counter N (FIG. 7) is at zero and, therefore, I is disconnected from motor 15 and the document halts. The programmer uses keys 36 and 37 to move the document to the required first line position. Double pole key 36 sets the direction by feeding a "1" or "0" bit to pin two of 32 and to motor direction control M and sets the count direction of counter 38. Single pole key 37 switches pulse generator I to motor 15, so that the paper drive runs in the direction set by 36. Counter 38 counts the stepper pulses of I so that, when the programmer halts the document, the linefeed step count — as also the direction bit and system control bit — are set up in 32. Of double pole key 40, one pole inserts a zero bit while one pole of double pole key 41 inserts a "1" bit into 42. The other poles of these two switches trigger a 54 bit shift by R. As E.5 has increased the total number of shift positions in the E.1-2-3-5 shift registers to 55, each 54 bit shift moves the "1" bit one position to the right of its previous position. Each time either key 40 or 41 is used to insert a bit into 42, the activated l.e.d. 12 switches off and the next l.e.d. to the right is switched on. The position of the "lit" l.e.d. above the document line is thus directly related to the linear position of the "1" or "0" bit programmed into 42. The programmer uses key 40 to program unmarked spaces along the document line, and key 41 to program markers above spaces where originators insert data. When the "1" bit in recirculation in E.1-2-3-5 moves back into E.5 it is erased and a 54 bit shift by R is triggered to recirculate 42 and copy the bits programmed into 42, into E.1-2-3. The programmer can then visually verify the position of the programmed markers above the document line. If correct, key 44 is used to close switch 39 between 32 and 42 and trigger D to shift the 10 + 54 bits in 32 and 42 into program buffer store B. If incorrect, then switch 43 erases the contents of 42, E.1-2-3, so that the markers can be re-programmed.

When all lines on the document have been programmed, the contents of B are read into external store A for use by the operators and the circuit can be re-set to normal operations.

Figure 9:
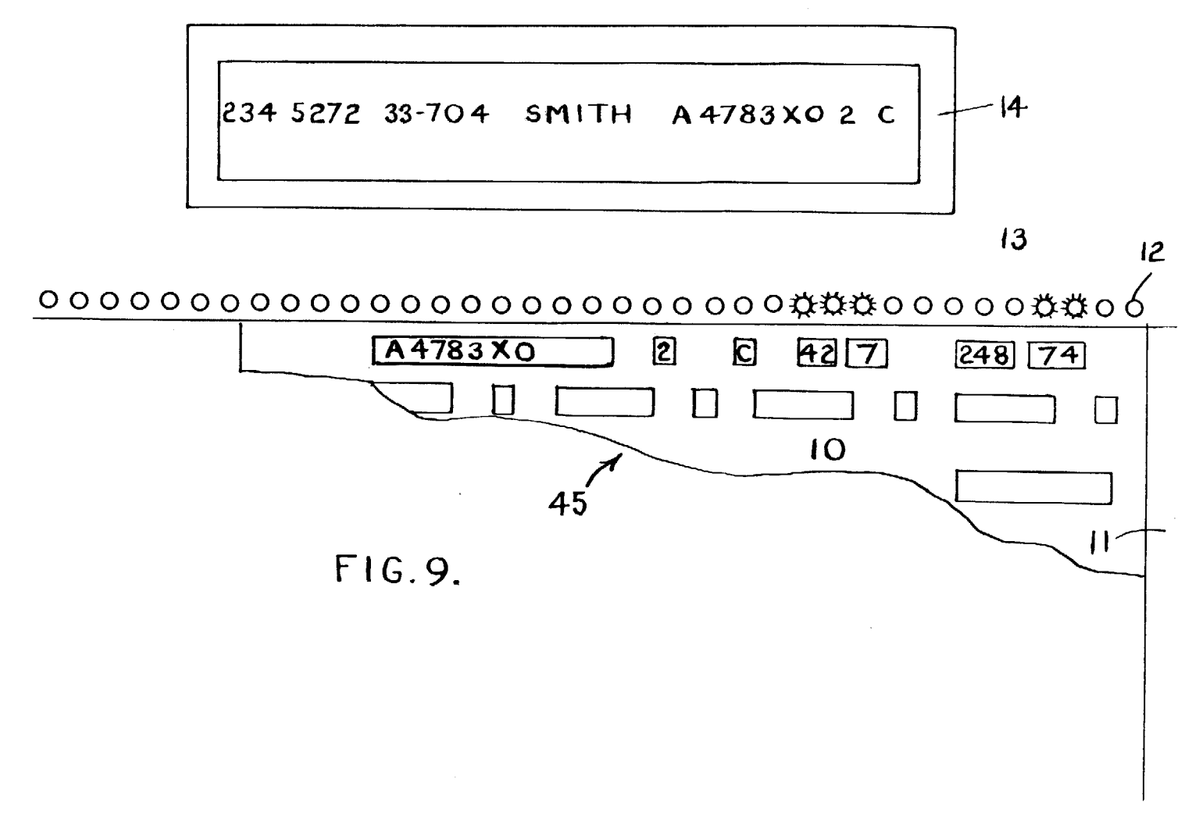
FIG. 9 is a representation of an operator's view of a document, activated field markers and an alpha/numeric display

FIG. 9 shows one line of a document 45 below the l.e.d. markers 12 and display 14. The lines on the document already keyed, are behind the display plate 13 and, therefore are not in sight. Both field marking and keyed data appear to the operator superposed on the document line being keyed at present. The display shows from left to right: "234 5272 33-704 SMITH" — data inscribed and keyed from lines above those now visible. The field "A4783XO" was programmed for keying and, therefore, marked by activated l.e.d.'s 12. The operator has keyed it so that this field is displayed and the markers 12 above this field have been extinguished by the circuit described. Fields "2" and "C" have been similarly keyed and are now displayed, while their markers 12 are no longer activated. The operator is just starting to key the "4" of field "42" so this field is still marked and, as the "4" has not been keyed, it is not displayed. Similarly, fields "7" and "74" are to be keyed, as they have been marked by the program, but field "248" is not to be keyed as it is unmarked. Field "42" is, thus, the "present" for the operator, and fields "7" and "74" are the "future" — format instructions. The fields keyed previously are in the "past" and, therefore, displayed alpha-numerically.

Three different sets of information are, thus, displayed in order to show the operator the past, present and future, without the need for her to move her vision from the document to the CRT of a VDU, remember the document format, or manually move a ruler or bit of paper to indicate the "present line." The information is presented in the most useful and economically suitable manner.

SUMMARY

The first set of information is the data inscribed by an originator in fields — blank spaces — arranged for this purpose on preprinted documents, such as Insurance and Banking forms, applications for Driving or Vehicle Licences, and so on.

The second set of information is that which has been pre-programmed into A (FIG. 7) and related to the position of these fields on the document and the order in which they must be keyed by the key operator.

A third set of information is the data which has been keyed by the key operator and which must be checked for key accuracy by a verifying operator.

The first set of information is seen by the key operator by reason of its inscription on the document to be keyed. The second set of information is fed into the unit from external program store A, illustrated in FIG. 7. It is used by the electronics (FIG. 7) in order to move the document line below a row of marker l.e.d.'s (FIGS. 1, 2, 4 and 5) — (12) — and switch on those l.e.d's in row (12) which have been pre-programmed. As each field is keyed and/or accepted by the controlling system, the circuit automatically switches off, field by field, the markers programmed above each field space to indicate this space and its length. The direction in which field markers are switched off depends upon the reading direction of the operator, i.e. in the Western world from left to right. The third set of information is the data which the operator has just keyed. She can then visually check her work if the controlling system inaugurates an alarm because the field keyed is invalid or does not check digit verify or does not fulfill any particular requirement programmed into the controlling system. This third set of information is, alternatively, used to show the verifying operator the data previously keyed at the key operator so that, during verification, the difference between key operator keyed and verifier operator keyed data can be visually compared with the data inscribed in the marked field at which the verifier operator is halted, due to non-comparison.

As this third set of information is produced by keyboard key depressions by the operators, or is feedback information from a controlling system, it has been considered to be part of the second set. In fact, there are three sets of information, that inscribed by the document originator, that pre-programmed to move the document to specific document lines, mark specific areas on document lines and eliminate this marking in accordance with the manner in which data keying proceeds and, thirdly, the displayed keyed data with feedback information related to this data, produced by a controlling system.

Characters keyed by the operator are fed in parallel, both to the Burroughs Self-Scan display and the input of a controlling system. Data keyed into the Self-Scan enters from the right and moves to the left as each character is entered. The 33rd character disappears from the display at the far left. The operator is concerned with the characters keyed in at the far right, as the controlling system halts her for correction when an error is detected in the field being keyed, i.e. the one entering at the right. The line of 32 characters displayed can be considered to be a single line on a conventional VDU. If the operator uses her keyboard ERASE key, the erase signal not only informs the controlling system of the erasure or deletion, but also causes the characters in the Self-Scan display to move one character space to the right each time this key is used. Thus, the ERASE key moves the displayed characters from left to right, deleting the erased characters.

COMPONENTS USED

In addition to the items already mentioned the following commercially available items may be used in the logic circuits of FIGS. 7 and 8:

| | | |
|---|---|---|
| Stepping motor drive circuits | IMPEX boards 9904 131 03003 and EMCN 1822 S, or other commercially available equivalent. | |
| Integrated - Type circuits | 7400 - | National Semi-conductors or other equivalent |
| | 7402 | " |
| | 7407 | " |
| | 7404 | " |
| | 7408 | " |
| | 7430 | " |
| | 7495 | " |
| | 7496 | " |
| | 7474 | " |
| | 74L108 | " |
| | 74126 | " |
| | 74132 | " |
| | 74161 | " |
| | 74193 | " |
| | 74L04 | " |
| | DM8833 | " |
| | M2533V | " |
| | NE555V | " |
| | SL-6-2064-Signetics | " |
| | 7130 - ITT | " |

I claim:

1. In a display system a visual display unit for batch document entry, a keyboard, a support for a source document containing data to be keyed into the system, a visual display unit for displaying data newly keyed, the improvement comprising a method by which the data system operates including providing a datum line transversely of said support, feeding said source document towards or away from said datum line so that a line containing a field or fields of source data next to be keyed is visible and is adjacent said datum line, providing above said datum line and parallel therewith a series of marker light sources, feeding signals from the system to illuminate those light sources which are above a particular field or fields of source data next to the keyed in linear sequence by an operator and locating said display unit immediately above said marker light sources to display data newly keyed in so that three sources of information are displayed to the operator at the same time and in juxtaposition.

2. A data entry system including a data processing machine comprising:

a keyboard, operated by an operator, including means for generating signals, means for feeding said signals generated by said keyboard into said data processing machine, said signals corresponding to data read by the operator from a source information carrier, said data processing machine including means for producing instructions for the operator to determine which data on said source information carrier is to be keyed in with said keyboard, means for visually displaying said instructions, and a document feeder including a plate for supporting said source information carrier in a position to be read by the operator, said means for visually displaying being located in juxtaposition to said plate.

3. A data entry system according to claim 2 further comprising means for visually displaying alpha/numeric feedback information corresponding to said data, said means for visually displaying alpha/numeric information being located above said means for visually displaying said instructions.

4. A data entry system according to claim 2 wherein the source information carrier comprises a document having characters inscribed thereon in lines of fields, said characters comprising said data, and further comprising means for marking fields in any X-Y position on the document in any order, thereby enforcing a keying sequence which is directly in a reformat order.

5. A data entry system according to claim 2 wherein said source information carrier comprises a document having characters inscribed thereon in lines of fields, said characters comprising said data, said means for visually displaying said instructions including light producing devices, said light producing devices being positioned along the line of fields having characters to be keyed in.

6. A data entry system according to claim 5 further comprising means for displaying to an operator the occurrence of a keying error detected by an external processor by means of a light emitting device responsive to the said error signal originating from said external processor, said light emitting device flashing at a low frequency on receipt of the error signal.

7. A data entry system according to claim 5 wherein said document feeder comprises a plurality of pinch rollers, fulcrum bars each supporting a pinch roller, a platen roller and spring means for independently urging said pinch rollers into contact with said platen roller, said pinch rollers and platen roller feeding said source information carrier into said document feeder.

8. A data entry system according to claim 7 further comprising a friction strip affixed to said plate to prevent two source information carriers from being fed into said document feeder at the same time.

9. A data entry system according to claim 5 wherein said light producing devices comprise light emitting diodes.

10. A data entry system for use with an external and independent passive data storage device, and operated by an operator, comprising:
   a. a keyboard, operated by the operator, including means for generating data codes and means for feeding the codes directly to the passive data storage device;
   b. an alpha-numeric display means, said generating means including means for feeding the codes in parallel to said alpha-numeric display means;
   c. a plate, coupled to said display means, for movably supporting a source data carrier having field spaces for data inscribed on the data carrier by a data originator, and placed by the operator on said plate;
   d. a row of light emitting markers located above said plate;
   e. means, coupled to said plate, for moving the data carrier along said plate and under said markers, and for reversing the movement of the data carrier along said plate; and
   f. logic circuit means, operated by a program fed into the system by the operator and connected to said moving means and markers, for controlling said moving means to move the data carrier and the illumination of said markers in accordance with the program fed into the system, wherein the data codes comprise function signals for said circuit means to move the program forward to turn off markers above field spaces which are left blank by the data originator, to move the program forward to move the carrier past complete lines of field spaces which are left blank by the originator and to move the program backward to move the carrier to line of field spaces above which the markers have been already turned off, whereby the attention of the operator may be drawn to particular sets of the data inscribed on the data carrier by a data originator in a sequential order which conforms to the sequential data entry requirements of a program of a data processor which in the course of time may process data keyed by the operator and stored by the data storage device.

11. A data entry system according to claim 10, wherein said system is further used with a separate and independent real time data processor, and further comprising: means for feeding the codes directly to the real time data processor, said display means and said circuit means being responsive to signals generated by the real time data processor in response to the codes to move forward or to reverse the program fed into the system by the operator to override the programmed sequential movement of the source data carrier and illumination of the markers.

12. A data entry system according to claim 10 wherein said display means is mounted directly above said row of light emitting markers, wherein said markers, due to their position above the source data carrier supported by said plate, are at any instant in time directly above a line of inscribed data on the carrier which the operator is keying in at a given moment.

13. A data entry system according to claim 11 wherein said display means is mounted directly above said row of light emitting markers, wherein said markers, due to their position above the source data carrier supported by said plate, are at any instant in time directly above a line of inscribed data on the carrier which the operator is keying in at a given moment.

* * * * *

UNITED STATES PATENT AND TRADEMARK OFFICE
CERTIFICATE OF CORRECTION

PATENT NO. : 3,974,496
DATED : August 10, 1976
INVENTOR(S) : APTROOT-SOLOWAY

It is certified that error appears in the above—identified patent and that said Letters Patent are hereby corrected as shown below:

Column 2, line 44, "bck" should read --- back ---;

Column 3, line 56, "lat" should read --- last ---;

Column 4, line 30, the word "line" should be deleted; and

Column 8, line 3, "at" should read --- by ---.

Signed and Sealed this

Ninth Day of November 1976

[SEAL]

Attest:

RUTH C. MASON
*Attesting Officer*

C. MARSHALL DANN
*Commissioner of Patents and Trademarks*